Feb. 5, 1935.  I. HECHENBLEIKNER  1,990,233
MANUFACTURE OF PHOSPHORIC ACID
Filed March 24, 1931
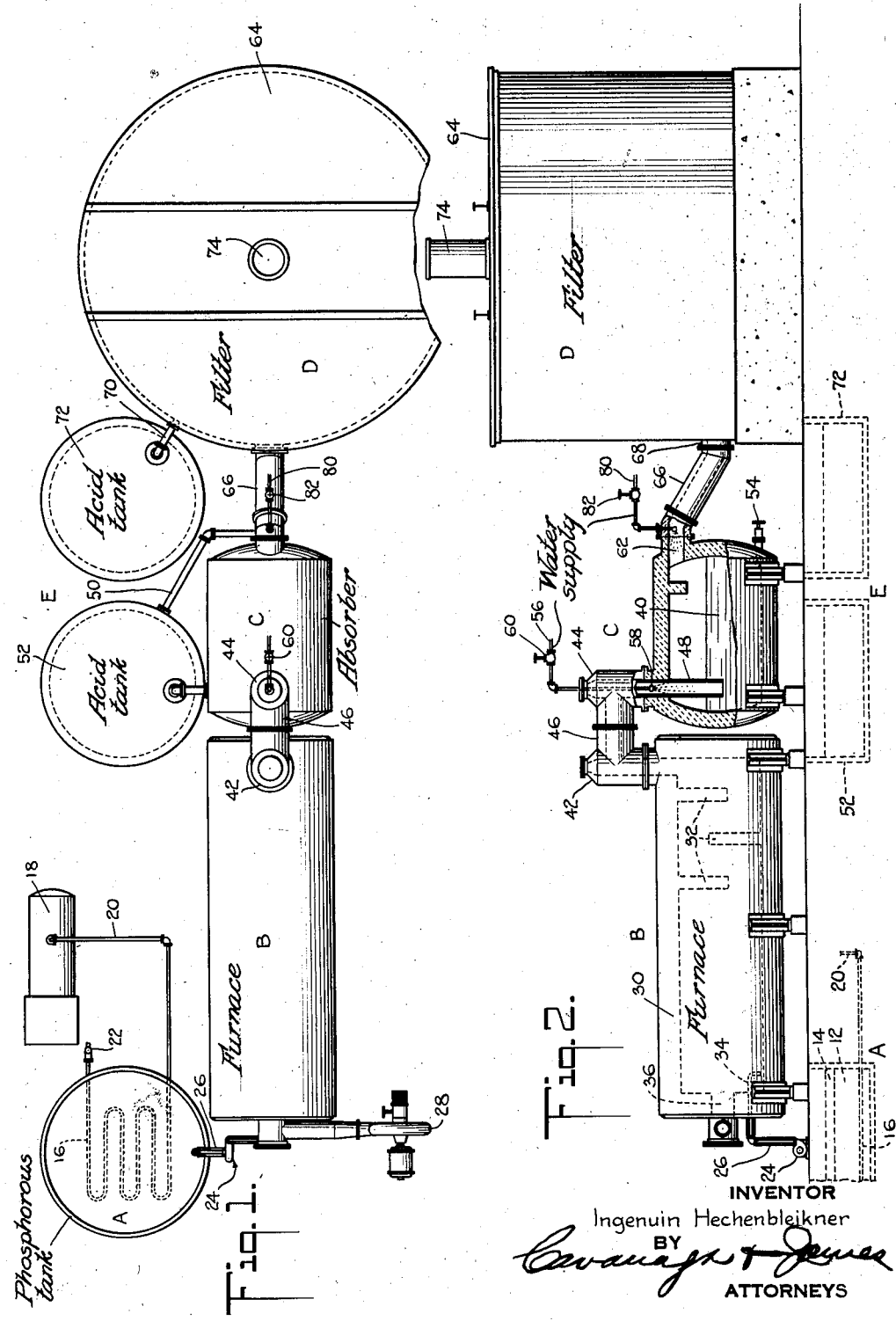
INVENTOR
Ingenuin Hechenbleikner
BY
ATTORNEYS Patented Feb. 5, 1935

1,990,233

UNITED STATES PATENT OFFICE 1,990,233

MANUFACTURE OF PHOSPHORIC ACID

Ingenuin Hechenbleikner, Charlotte, N. C., assignor to Chemical Construction Corporation, Charlotte, N. C., a corporation of Delaware Application March 24, 1931, Serial No. 524,793

4 Claims. (Cl. 23—165)

This invention relates to phosphorous compounds, particularly phosphoric acid, and to a method and means for manufacturing the same.

Processes developed in recent years make available in large quantities elemental yellow phosphorous obtained from mined phosphate rock. The phosphorous may be safely shipped in large quantities in tank cars containing water protectively covering the same. The primary object of the present invention is to provide a method and means for manufacturing phosphoric acid or phosphates directly from yellow phosphorous in an exceedingly rapid and economical manner. In accordance with my process the phosphorous is molten and fed in a liquid state to a furnace in which it is burned to form the desired oxide or acid anhydride. The oxide is then fed in a vaporous state directly into an absorbing liquid, such as water or phosphoric acid if phosphoric acid is to be made, or alkali solutions if alkaline phosphate solutions are to be made.

The anhydride gas is readily taken up in this manner. However, some of the acid in vaporous or mist form may be carried along with the waste gases discharged from the absorber. This condition is aggravated by the fact that the hydration of the anhydride is exothermic and tends to increase the temperature of the waste gases leaving the absorber. Accordingly, a further object of the present invention is to regain any acid contained in the waste gases, and thereby increase the over-all efficiency of the apparatus. With this object in view the waste gases discharged from the absorber are cooled and preferably also obstructed as by passing the same through a cooled multiple baffle system in order to condense residual acid contained in the waste gases. The multiple baffle preferably takes the form of a coke filter through which the waste gases may be passed upwardly. The filter may be water cooled or more simply provided with a lead roof for air cooling. Acid condensed in the coke filter flows downwardly in intimate contact with the rising gases, and finally is collected at the bottom of the filter.

The anhydride is preferably absorbed in phosphoric acid, and this is withdrawn from the absorber when of desired strength, the deficiency being made up by the addition of makeup water. The products of combustion from the furnace are at a temperature which is considerably higher than the optimum temperature for rapid absorption. Further objects of the present invention are to provide the desired makeup water for the operation of the absorber, and at the same time to cool the combustion gas supplied thereto. This is best accomplished by feeding the anhydride gas together with a spray of makeup water to the absorber. The water spray cools the combustion gases and preliminarily absorbs some of the anhydride. The remainder of the anhydride is absorbed as the gas is bubbled through the body of phosphoric acid in the absorber.

It is convenient to be able to obtain condensed acid in the coke filter which is of the same strength as the main body of acid being made in the absorber. The efficiency of the coke filter, as well as the strength of acid obtained therefrom depend not not only upon the cooling of the filter, but also upon the temperature of the waste gases supplied thereto. In accordance with a further object and feature of my invention these waste gases are cooled during their passage from the absorber to the filter, preferably by forcing the same through a small additional water spray the rate of flow of which may be appropriately adjusted to regulate the strength of acid obtained from the filter.

To the accomplishment of the foregoing and such other objects as will hereinafter appear, my invention consists in the method and apparatus elements and their relation one to the other as hereinafter are more particularly described in the specification and sought to be defined in the claims. The specification is accompanied by drawing in which:

Fig. 1 is a plan view of apparatus constructed in accordance with the present invention; and Fig. 2 is a partially sectioned side elevation of the same.

Referring to the drawing, the apparatus comprises generally a phosphorous tank A, a phosphorous furnace B, an absorber C, a coke filter D, and acid tanks E for receiving the product acid.

Considering the apparatus in greater detail, the phosphorous tank A is preferably buried, as shown, and is filled with a body of phosphorous 12 which is protectively covered by a body of water 14. The tank includes a heating coil 16 submerged in the body of phosphorous 12. A heating medium, such as hot water or steam, is supplied to coil 16. In the present case steam is used and is supplied to the coil from a boiler 18 through a pipe 20, while the discharge end of coil 16 is provided with an appropriate steam trap 22. Inasmuch as the phosphorous melts at a relatively low temperature, approximately 112° Fahrenheit, keeping the same molten and safely covered with the body of water 14 presents no difficulty.

The molten phosphorous is pumped from the tank A by a pump 24, and fed to the furnace B. The phosphorous piping is preferably made as short and as direct as possible, and is jacketed as shown at 26 to prevent solidification of the phosphorous and stoppage of the feed line.

Air is supplied to the furnace by an appropriate blower 28. The rate of air supply is made amply sufficient to insure thorough combustion of the phosphorous.

The furnace B preferably comprises a steel shell which is fitted with a fire resistant lining. More specifically, the shell may be lined with asbestos paper, insulating brick, and then fire brick, the whole forming a composite lining indicated generally at 30. The furnace is also provided with baffle walls 32 which lengthen the path and time of the combustion gases in the furnace and insure intimate mixture of the same, thereby permitting efficient and complete combustion of the phosphorous.

The burning of the phosphorous may be accomplished in any desired manner. In the present case the phosphorous is simply discharged from a pipe 34 onto the floor of the furnace near the inlet end of the same, where it is instantaneously ignited and burned by the stream of air being blown into the furnace through duct 36. The burning mechanism is not shown in detail, but may take any of the forms described in my copending application, Ser. No. 524,794, filed on even date herewith, or, if desired, may take the form of a preferably jacketed spray burner or gun such as is disclosed in my copending application, Ser. No. 321,115, filed November 22, 1928. The particular way in which the phosphorous is ignited is of no direct importance as regards the present invention which deals with the complete process for the production of phosphoric acid.

The absorber C takes the form of a preferably horizontally disposed drum which is approximately half filled with a body 40 of phosphoric acid. The drum comprises a steel shell lined with acid resistant material. Specifically, the lining may comprise a layer of asbestos followed by a layer of lead and finally a surface of acid-proof brick. The furnace B and absorber C may be closely juxtaposed, thereby shortening and simplifying the piping between the same, which includes merely an outlet 42 from furnace B, and inlet 44 to absorber C, and a flanged connection 46 therebetween. This piping may also be appropriately lined to resist temperature and acid. The inlet 44 of the absorber preferably includes a downwardly extending tube 48 the lower end of which is immersed in the body of absorbing liquid 40. This tube is preferably made of carbon so as to be acid resistant, and its immersion in phosphoric acid insures discharge of the combustion gases through the acid.

Product acid of desired concentration is withdrawn from the bottom of absorber C through a pipe 50 and led to a tank 52. The tank may be lined with lead and acid-proof brick, and is preferably buried, thereby permitting of simple gravity flow of the product acid. The piping is preferably made of duriron. The acid may be removed from absorber C in batches under manual control, or a steady leakage or trickle may be preferred. In either case the flow may be regulated by valve 54. The level of the liquid in absorber C is maintained by feeding makeup liquid, preferably water, into the absorber. In the present case this water is supplied through a pipe 56 which terminates in a small spray head 58 located within the carbon tube 48. The rate of flow of makeup water may be regulated by a valve 60. The resulting spray of water when applied in this manner serves a dual function in that it cools the combustion gases entering the absorber, and preliminarily absorbs anhydride from the same, as well as makes up for the product acid withdrawn from the absorber.

The waste gases from absorber C are fed through outlet 62, interconnecting pipe 66, and inlet 68 to the bottom of the coke filter D. The gases then rise upwardly through the coke which acts in effect merely as a complicated multiple baffle which physically obstructs the flow of the gas and more particularly of liquid or mist carried thereby. The roof of the filter is being continually air cooled, and this aids condensation of any acid contained in the waste gases. Such condensed acid flows downwardly through the filter and is collected at the bottom of the same and run through a discharge pipe 70 to acid tank 72. During its descent in the filter the condensed acid helps regain additional acid from the waste gases rising through the filter. The clean waste gases are finally discharged through outlet 74.

The hydration of the anhydride in absorber C is exothermic, and the resulting evolution of heat causes an unexpectedly high acid content in the waste gases discharged from the absorber. Despite this fact, the present apparatus, including cooling and baffling condenser means such as the coke filter D heretofore described, may readily be operated with an acid yield of as high as 99½%. In other words, there is no appreciable loss of phosphoric acid in the absorption system comprising absorber C and coke filter D operating in combination.

If desired, an additional water spray supplied with water through a pipe 80 and valve 82 may be provided in outlet 62 of the absorber C. This spray cools the waste gases going to the coke filter, and makes it possible to regulate the strength of the acid collected therein. In this way the strengths of the phosphoric acid collected in tanks 52 and 72 may be adjusted to the same value.

The process is exceedingly efficient in commercial practice and requires only relatively compact apparatus for practicing the same. The power consumption for operating the phosphorous pump and air blower is relatively small. Five hundred to six hundred pounds of phosphorous may be burned per hour in a plant of moderate size producing a high and efficient yield of 55° (Baumé) acid.

While the process has been described in some detail in connection with the direct production of phosphoric acid, it will be understood that the process may equally well be applied to the production of phosphorous salts. For example, an absorber may be used in which alkali solutions are carried, thereby forming alkaline phosphate solutions with the acid anhydride. If desired, the salts may subsequently be prepared from the salt solution.

It is believed that the process of the present invention, the apparatus for and mode of practicing the same, as well as the many advantages thereof, will, for the most part, be apparent from the foregoing description thereof. The phosphorous is simply molten and fed directly to a furnace where it is burned at a rapid rate to form the acid anhydride. The combustion gases are supplied to an absorber for making the desired product, and the waste gases from the absorber may be additionally passed through baffling and condensing apparatus in order to thoroughly recapture from the same the desired product. The efficiency of the system as a whole may be increased by supplying makeup water in the form of a cooling spray in the passage of the combustion gases to the absorber, while an additional spray may, if desired, be employed at the outlet from the absorber.

It will be apparent that while I have shown and described my invention in the preferred form, many changes and modifications may be made in the method and structure disclosed, without departing from the spirit of the invention, defined in the following claims.

I claim:

1. A method of producing phosphoric acid solution which comprises forming phosphoric anhydride in the vapor state, mixing said vapors with a spray of water, causing the mixture to pass through a body of an aqueous solution of phosphoric acid to cause absorption thereof, and finally cooling the gases.

2. A method of producing phosphoric acid solution which comprises forming phosphoric anhydride in the vapor state, mixing said vapors with a spray of water, causing the mixture to pass through a body of an aqueous solution of phosphoric acid to cause absorption thereof, and finally cooling the gases by passing the same through a cooled baffle means.

3. A method of producing phosphoric acid solution which comprises forming phosphoric anhydride in the vapor state, mixing said vapors with a spray of water, causing the mixture to pass through a body of an aqueous solution of phosphoric acid to cause absorption thereof, finally cooling the gases by passing the same through a cooled baffle means and collecting the condensed acid from said means.

4. A method of producing phosphoric acid solution which comprises forming phosphoric anhydride in the vapor state, mixing said vapors with a spray of water, causing the mixture to pass through a body of an aqueous solution of phosphoric acid to cause absorption thereof, mixing the gases with a water spray, and finally cooling the gases.

INGENUIN HECHENBLEIKNER.